United States Patent
Saraf et al.

(10) Patent No.: US 8,701,189 B2
(45) Date of Patent: Apr. 15, 2014

(54) METHOD OF AND SYSTEM FOR COMPUTER SYSTEM DENIAL-OF-SERVICE PROTECTION

(75) Inventors: Suman Saraf, Gurgaon (IN); Sharad Agrawal, Gurgaon (IN); Pankaj Kumar, Gurgaon (IN)

(73) Assignee: McAfee, Inc., Santa Clara, CA (US)

( * ) Notice: Subject to any disclaimer, the term of this patent is extended or adjusted under 35 U.S.C. 154(b) by 821 days.

(21) Appl. No.: 12/322,321

(22) Filed: Jan. 29, 2009

(65) Prior Publication Data

US 2013/0247181 A1 Sep. 19, 2013

Related U.S. Application Data

(60) Provisional application No. 61/063,224, filed on Jan. 31, 2008.

(51) Int. Cl.
*G06F 21/00* (2013.01)
(52) U.S. Cl.
USPC ............. 726/23; 709/224; 709/225; 709/229; 713/150; 713/254; 370/230; 370/395; 726/22; 726/25
(58) Field of Classification Search
USPC .......................................................... 726/23
See application file for complete search history.

(56) References Cited

U.S. PATENT DOCUMENTS

| | | |
|---|---|---|
| 4,688,169 A | 8/1987 | Joshi |
| 4,982,430 A | 1/1991 | Frezza et al. |
| 5,155,847 A | 10/1992 | Kirouac et al. |
| 5,222,134 A | 6/1993 | Waite et al. |
| 5,390,314 A | 2/1995 | Swanson |
| 5,521,849 A | 5/1996 | Adelson et al. |
| 5,560,008 A | 9/1996 | Johnson et al. |
| 5,699,513 A | 12/1997 | Feigen et al. |
| 5,778,226 A | 7/1998 | Adams et al. |
| 5,778,349 A | 7/1998 | Okonogi |
| 5,787,427 A | 7/1998 | Benantar et al. |
| 5,842,017 A | 11/1998 | Hookway et al. |
| 5,907,709 A | 5/1999 | Cantey et al. |
| 5,907,860 A | 5/1999 | Garibay et al. |
| 5,926,832 A | 7/1999 | Wing et al. |

(Continued)

FOREIGN PATENT DOCUMENTS

| | | |
|---|---|---|
| EP | 1 482 394 A2 | 12/2004 |
| EP | 2 037 657 A1 | 3/2009 |

(Continued)

OTHER PUBLICATIONS

A Linear-Time Heuristic for Improving Network Partitions|http://ieeexplore.ieee.org/stamp/stamp.jsp?tp=&arnumber=1585498|Fiduccia et al. |pp. 175-181|1982.*

(Continued)

*Primary Examiner* — Mahfuzur Rahman
(74) *Attorney, Agent, or Firm* — Patent Capital Group

(57) ABSTRACT

A method of and system for protecting a computer system against denial-of-service attacks or other exploitation. The method comprises collecting network data and analyzing the network data using statistical and heuristic techniques to identify the source of the exploitation upon receiving an indication of exploitation. Upon identifying the network source, the network data associated with the network is blocked, redirected, or flow controlled. Preferably, the method also includes identifying when the system is being exploited.

26 Claims, 4 Drawing Sheets

(56) References Cited

U.S. PATENT DOCUMENTS

| | | |
|---|---|---|
| 5,974,149 A | 10/1999 | Leppek |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |
| 6,141,698 A | 10/2000 | Krishnan et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 460,050 A1 | 10/2002 | Pace et al. |
| 6,587,877 B1 | 7/2003 | Douglis et al. |
| 6,611,925 B1 | 8/2003 | Spear |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,346,781 B2 | 3/2008 | Cowle et al. |
| 7,349,931 B2 | 3/2008 | Horne |
| 7,350,204 B2 | 3/2008 | Lambert et al. |
| 7,353,501 B2 | 4/2008 | Tang et al. |
| 7,363,022 B2 | 4/2008 | Whelan et al. |
| 7,370,360 B2 | 5/2008 | van der Made |
| 7,406,517 B2 | 7/2008 | Hunt et al. |
| 7,441,265 B2 | 10/2008 | Staamann et al. |
| 7,464,408 B1 | 12/2008 | Shah et al. |
| 506,155 A1 | 3/2009 | Stewart et al. |
| 7,506,170 B2 | 3/2009 | Finnegan |
| 7,546,333 B2 | 6/2009 | Alon et al. |
| 7,546,594 B2 | 6/2009 | McGuire et al. |
| 7,552,479 B1 | 6/2009 | Conover et al. |
| 7,607,170 B2 * | 10/2009 | Chesla ............................ 726/22 |
| 7,657,599 B2 | 2/2010 | Smith |
| 7,669,195 B1 | 2/2010 | Qumei |
| 7,685,635 B2 | 3/2010 | Vega et al. |
| 7,698,744 B2 | 4/2010 | Fanton et al. |
| 7,703,090 B2 | 4/2010 | Napier et al. |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 | 12/2010 | Bloch et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes et al. |
| 7,895,573 B1 | 2/2011 | Bhargava et al. |
| 7,908,653 B2 | 3/2011 | Brickell et al. |
| 7,937,455 B2 | 5/2011 | Saha et al. |
| 7,966,659 B1 | 6/2011 | Wilkinson et al. |
| 7,996,836 B1 | 8/2011 | McCorkendale et al. |
| 8,015,388 B1 | 9/2011 | Rihan et al. |
| 8,015,563 B2 | 9/2011 | Araujo et al. |
| 8,028,340 B2 | 9/2011 | Sebes et al. |
| 8,074,276 B1 * | 12/2011 | Beloussov et al. ............... 726/22 |
| 8,195,931 B1 | 6/2012 | Sharma et al. |
| 8,234,713 B2 | 7/2012 | Roy-Chowdhury et al. |
| 8,307,437 B2 | 11/2012 | Sebes et al. |
| 8,321,932 B2 | 11/2012 | Bhargava et al. |
| 8,332,929 B1 | 12/2012 | Bhargava et al. |
| 8,341,627 B2 | 12/2012 | Mohinder |
| 8,381,284 B2 | 2/2013 | Dang et al. |
| 8,515,075 B1 | 8/2013 | Saraf et al. |
| 2002/0056076 A1 | 5/2002 | van der Made |
| 2002/0069367 A1 | 6/2002 | Tindal et al. |
| 2002/0083175 A1 * | 6/2002 | Afek et al. .................... 709/225 |
| 2002/0099671 A1 | 7/2002 | Mastin Crosbie et al. .... 705/500 |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0073894 A1 | 4/2003 | Chiang et al. |
| 2003/0074552 A1 | 4/2003 | Olkin et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 * | 7/2003 | Poletto et al. ................. 713/201 |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson .......................... 709/206 |
| 2004/0051736 A1 | 3/2004 | Daniell |
| 2004/0054928 A1 | 3/2004 | Hall |
| 2004/0143749 A1 | 7/2004 | Tajalli et al. |
| 2004/0167906 A1 | 8/2004 | Smith et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2005/0018651 A1 | 1/2005 | Yan et al. |
| 2005/0086047 A1 | 4/2005 | Uchimoto et al. |
| 2005/0108516 A1 * | 5/2005 | Balzer et al. .................. 713/150 |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0228990 A1 | 10/2005 | Kato et al. |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |

(56) References Cited

U.S. PATENT DOCUMENTS

| | | |
|---|---|---|
| 2006/0136910 A1 | 6/2006 | Brickell et al. |
| 2006/0136911 A1 | 6/2006 | Robinson et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0282892 A1* | 12/2006 | Jonnala et al. .......... 726/23 |
| 2007/0011746 A1 | 1/2007 | Malpani et al. |
| 2007/0028303 A1 | 2/2007 | Brennan |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0169079 A1 | 7/2007 | Keller et al. |
| 2007/0192329 A1 | 8/2007 | Croft et al. |
| 2007/0220061 A1* | 9/2007 | Tirosh et al. .......... 707/200 |
| 2007/0220507 A1 | 9/2007 | Back et al. |
| 2007/0253430 A1* | 11/2007 | Minami et al. .......... 370/395.52 |
| 2007/0256138 A1 | 11/2007 | Gadea et al. |
| 2007/0271561 A1 | 11/2007 | Winner et al. |
| 2007/0300215 A1 | 12/2007 | Bardsley |
| 2007/0300241 A1 | 12/2007 | Prakash et al. |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1* | 2/2008 | Kumar et al. .......... 726/15 |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0294703 A1 | 11/2008 | Craft et al. |
| 2008/0301770 A1 | 12/2008 | Kinder |
| 2009/0006805 A1 | 1/2009 | Anderson et al. |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0172822 A1 | 7/2009 | Sahita et al. |
| 2009/0249053 A1 | 10/2009 | Zimmer et al. |
| 2009/0249438 A1 | 10/2009 | Litvin et al. |
| 2010/0071035 A1 | 3/2010 | Budko et al. |
| 2010/0100970 A1 | 4/2010 | Chowdhury et al. |
| 2010/0114825 A1 | 5/2010 | Siddegowda |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047543 A1 | 2/2011 | Mohinder |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2012/0030731 A1 | 2/2012 | Bhargava et al. |
| 2012/0030750 A1 | 2/2012 | Bhargava et al. |
| 2012/0179874 A1 | 7/2012 | Chang et al. |
| 2012/0204263 A1* | 8/2012 | Jonnala et al. .......... 726/23 |
| 2012/0278853 A1 | 11/2012 | Chowdhury et al. |
| 2012/0290827 A1 | 11/2012 | Bhargava et al. |
| 2012/0297176 A1 | 11/2012 | Bhargava et al. |
| 2012/0331464 A1 | 12/2012 | Saito et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0117823 A1 | 5/2013 | Dang et al. |

FOREIGN PATENT DOCUMENTS

| | | |
|---|---|---|
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |
| WO | WO 2013/055498 | 4/2013 |
| WO | WO 2013/055499 | 4/2013 |
| WO | WO 2013/055502 | 4/2013 |

OTHER PUBLICATIONS

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

U.S. Appl. No. 12/636,414, entitled "System and Method for Managing Virtual Machine Configurations," filed Dec. 11, 2009, Inventor(s): Harvinder Singh Sawhney, et al.

Kurt Gutzmann, "Access Control and Session Management in the HTTP Environment," Jan./Feb. 2001, pp. 26-35, IEEE Internet Computing.

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," Filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

(56) References Cited

OTHER PUBLICATIONS

U.S. Appl. No. 12/008,274, entitled Method and Apparatus for Process Enforced Configuration Management, filed Jan. 9, 2008, Inventor(s): Rishi Bhargava et al.
U.S. Appl. No. 12/291,232, entitled "Method of and System for Computer System State Checks," filed Nov. 7, 2008, inventor(s): Rishi Bhargava et al.
U.S. Appl. No. 12/322,220, entitled "Method of and System for Malicious Software Detection Using Critical Address Space Protection," filed Jan. 29, 2009, Inventor(s): Suman Saraf et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/545,609, entitled "System and Method for Enforcing Security Policies in a Virtual Environment," filed Aug. 21, 2009, Inventor(s): Amit Dang et al.
U.S. Appl. No. 12/545,745, entitled "System and Method for Providing Address Protection in a Virtual Environment," filed Aug. 21, 2009, Inventor(s): Preet Mohinder.
Eli M. Dow, et al., "The Xen Hypervisor," InformIT, dated Apr. 10, 2008, http://www.informit.com/articles/printerfriendly.aspx?p=1187966, printed Aug. 11, 2009 (13 pages).
"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
U.S. Appl. No. 12/551,673, entitled "Piracy Prevention Using Unique Module Translation," filed Sep. 1, 2009, Inventor(s): E. John Sebes et al.
Barrantes et al., "Randomized Instruction Set Emulation to Dispurt Binary Code Injection Attacks," Oct. 27-31, 2003, ACM, pp. 281-289.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Gaurav et al., "Countering Code-Injection Attacks with Instruction-Set Randomization," Oct. 27-31, 2003, ACM, pp. 272-280.
Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Tal Garfinkel, et al., "Terra: A Virtual Machine-Based Platform for Trusted Computing," XP-002340992, SOSP'03, Oct. 19-22, 2003, 14 pages.
U.S. Appl. No. 12/844,892, entitled "System and Method for Protecting Computer Networks Against Malicious Software," filed Jul. 28, 2010, Inventor(s) Rishi Bhargava, et al.
U.S. Appl. No. 12/844,964, entitled "System and Method for Network Level Protection Against Malicious Software," filed Jul. 28, 2010, Inventor(s) Rishi Bhargava, et al.
U.S. Appl. No. 12/880,125, entitled "System and Method for Clustering Host Inventories," filed Sep. 12, 2010, Inventor(s) Rishi Bhargava, et al.
U.S. Appl. No. 12/903,993, entitled "Method and System for Containment of Usage of Language Interfaces," filed Oct. 13, 2010, Inventor(s) Rosen Sharma, et al.
U.S. Appl. No. 12/946,344, entitled "Method and System for Containment of Usage of Language Interfaces," filed Nov. 15, 2010, Inventor(s) Rosen Sharma, et al.
U.S. Appl. No. 13/012,138, entitled "System and Method for Selectively Grouping and Managing Program Files," filed Jan. 24, 2011, Inventor(s) Rishi Bhargava, et al.
U.S. Appl. No. 13/037,988, entitled "System and Method for Botnet Detection by Comprehensive Email Behavioral Analysis," filed Mar. 1, 2011, Inventor(s) Sven Krasser, et al.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.
IA-32 Intel® Architecture Software Developer's Manual, vol. 3B; Jun. 2006; pp. 13, 15, 22 and 145-146.
"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.
"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.
U.S. Appl. No. 13/728,705, filed Dec. 27, 2012, entitled "Herd Based Scan Avoidance System in a Network Environment," Inventor(s) Venkata Ramanan, et al.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.
Shacham, et al., "On the Effectiveness of Address-Space Randomization," CCS'04, Oct. 25-29, 2004, Washington, D.C., Copyright 2004, 10 pages.
International Search Report and Written Opinion mailed Dec. 14, 2012 for International Application No. 04796-1087WO, 9 pages.
"Shadow Walker" Raising the Bar for Rootkit Detection by Sherri Sparks and Jamie Butler, Black Hat Japan 2005, Tokyp, Japan, Oct. 17-18, 2005, 55 pages.
Countering Kernel Rootkits with Lightweight Hook Protection, available at http://research.microsoft.com/en-us/um/people/wdcui/papers/hooksafe-ccs09.pdf, 16th ACM Conference on Computer and Communications Security (CCS 2009) Chicago, IL, Nov. 2009, 10 pages.
Detecting Kernel Rootkits, by Rainer Whichmann, available at http://www.la-samhna.de/library/rootkits/detect.html, copyright 2006, 2 pages.
Guest-Transparent Prevention of Kernel Rootkits with VMM-Based Memory Shadowing, 11th International Symposium on Recent Advances in Intrusion Detection, Cambridge, Massachusetts (Sep. 15-17, 2008), 20 pages.
McAfee Proven Security, Rootkits, Part 1 of 3: The Growing Threat (Apr. 2006), available at www.mcafee.com, 8 pages.
Multi-Aspect Profiling of Kernel Rootkit Behavior, Eurosys Conference 2009, Nuremberg, Germany, Mar. 30-Apr. 3, 2009, 14 pages.

(56) References Cited

OTHER PUBLICATIONS

Rootkits Part 2: A Technical Primer, available at www.mcafee.com (http://www.mcafee.com/cf/about/news/2007/20070418_174400_d.aspx) Apr. 18, 2007, 16 pages.
SecVisor: A Tiny Hypervisor to Provide Lifetime Kernel Code Integrity for Commodity OSes, Proceedings of the 21st ACM SIGOPS Symposium on Operating Systems Principles, Stevenson, WA (Oct. 14-17, 2007), 16 pages.
Stopping Rootkits at the Network Edge (Jan. 2007) http://www.trustedcomputinggroup.org/files/resource_files/C2426F48-1D09-3519-AD02D13C711B888A6/Whitepaper_Rootkit_Strom_v3.pdf, 3 pages.
Transparent Protection of Commodity OS Kernels Using Hardware Virtualization, 6th International ICST Conference on Security and Privacy in Communication Networks, Singapore, Sep. 7-9, 2010, 18 pages, 18 pages.
International Search Report and Written Opinion mailed Jan. 25, 2013 for International Application No. PCT/US2012/055670 (7 pages).
International Search Report and Written Opinion, International Application No. PCT/US2012/055660, mailed Feb. 18, 2013, 10 pages.
Lecture Embedded System Security, Chapter 6: Return-oriented Programming, Prof. Dr.-Ing. Ahmad-Reza Sadeghi, et al., Technische Universitat Damstadt (CASED), Germany, Summer Term 2011, http://www.trust.informatik.tu-darmstadt.de/fileadmin/user_upload/Group_TRUST/LectureSlides/ESS-SS2011/rop-grayscale.pdf[Background on Butter Overflow Attacks/Sadeghi et al./2011, 51 pages.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
U.S. Appl. No. 13/558,181, entitled "Method and Apparatus for Process Enforced Configuration Management," filed Jul. 25, 2012, Inventor(s) Rishi Bhargava et al.
U.S. Appl. No. 13/558,227, entitled "Method and Apparatus for Process Enforced Configuration Management," filed Jul. 25, 2012, Inventor(s) Rishi Bhargava et al.
U.S. Appl. No. 13/558,277, entitled "Method and Apparatus for Process Enforced Configuration Management," filed Jul. 25, 2012, Inventor(s) Rishi Bhargava et al.

Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseexIst.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
Notice of Allowance received for U.S. Appl. No. 12/322,220, mailed on Apr. 17, 2013, 15 pages.
Final Office Action received for U.S. Appl. No. 12/545,745, mailed on Jun. 7, 2012, 14 pages.
Non Final Office Action received for U.S. Appl. No. 12/545,745, mailed on Jan. 5, 2012, 12 pages.
Notice of Allowance received for U.S. Appl. No. 12/545,745, mailed on Aug. 29, 2012, 8 pages.
Response to Final Office Action and RCE for U.S. Appl. No. 12/545,745, filed Jul. 31, 2012, 15 pages.
Response to Non Final Office Action for U.S. Appl. No. 12/545,745, filed Mar. 28, 2012, 12 pages.
International Search Report received for PCT Application No. PCT/US2012/055674, mailed on Dec. 14, 2012, 2 pages.
Nonfinal Office Action for U.S. Appl. No. 13/273,002, mailed on Oct. 4, 2013, 17 pages.
Grace, Michael, et al., "Transparent Protection of Commodity OS Kernels Using Hardware Virtualization," 2010, SecureComm 2010, LNICST 50, pp. 162-180, 19 pages.
Riley, Ryan, et al., "Guest-Transparent Prevention of Kernel Rootkits with VMM-Based Memory Shadowing," 2008, RAID 2008, LNCS 5230, pp. 1-20, 20 pages.
Milos, Grzegorz, et al., "Satori: Enlightened page sharing," Proceedings of the 2009 conference on USENIX Annual technical conference, 14 pages.

\* cited by examiner

METHOD OF AND SYSTEM FOR COMPUTER SYSTEM DENIAL-OF-SERVICE PROTECTION

RELATED APPLICATIONS

This application claims priority under 35 U.S.C. §119(e) of the co-owned U.S. Provisional Patent Application Ser. No. 61/063,224 filed Jan. 31, 2008, and entitled "AUTONOMIC NETWORK RESPONSE TO PROCESS HIJACKING," which is hereby incorporated by reference in its entirety.

FIELD OF THE INVENTION

The invention relates to computer software. Specifically, the invention relates to methods of and systems for providing denial-of-service protection. Protection is provided through the analysis of data including network, application, or process data to identify a network source of a detected exploitation, and processing the network data associated with exploitation to block, neutralize, and prevent a denial-of-service.

BACKGROUND OF THE INVENTION

Networked servers can provide services to other networked hosts. Some of these networked hosts attempt to exploit a server by taking advantage of security loopholes. One exploitation method uses a security hole to inject malicious code into the server memory, which executes the malicious code to exploit the server. This malicious code, also known as malware, can search the data structures of an application, a library, or an operating system component to find and utilize server system resources for the purpose of interrupting these services (such as denial-of-service attacks), to access sensitive information residing on the server, or to perform other malicious steps. Further, malware can by design or as a side effect disable a server resulting in a denial-of-service.

FIG. 1 illustrates one prior art configuration of a malicious host 110 requesting services from a trusted host 120 providing network services. The trusted host 120 is a computer server receiving service requests 112 over a network and providing services 114 such as web, mail, and file sharing. Malicious code is injected from the malicious host 110 into the trusted host 120 using a service request. The malicious host 110 requests a service 112 in which the request encapsulates malicious code. A maliciously structured service request can exploit buffer overflow techniques resulting in the malicious code 140 being loaded into memory 150 of the trusted host 120. Traditional methods of detecting malicious software include special purpose hardware 130 such as a firewall that inspects packets within a network data stream. The packet inspection tools include processing protocols such as HTTP, in which packet payloads are for the most part plain text data. Except for image data or graphics, which can be detected and identified, a firewall will inspect a packet for unexpected binary data. When packet inspection detects unexpected binary data, an indicator of potentially executable and malicious code, the firewall 130 can isolate either the host making the service request or the stream of transmitted data. The disadvantage of this solution is that additional hardware is required. Further, blindly inspecting all packets is processing intensive. Additionally, deep packet inspection techniques require the assembly of payload data streams spread across multiple network packets and result in increased data latency.

Another challenge presented by malicious code is to prevent reinfection of a server. While the objective of the malicious code is typically to exploit the server often, intentionally or unintentionally, the server's capability of providing services can be effected resulting in a denial-of-service. Further, prior art methods of detecting and neutralizing malicious code could leave a server unable to provide services and again resulting in a denial-of-service. Thus, while repetitive attempts to exploit a system might be unsuccessful, through prior art detection and neutralization means, the server is rendered unable to provide network services resulting in a denial-of-service.

SUMMARY OF THE INVENTION

In accordance with the present invention a method of and system for denial-of-service protection of a computer system comprises receiving an exploitation indication, analyzing data including network data, application data, and process data to identify a malicious source, and processing subsequently received network data identified as originating from the malicious source to prevent a denial-of-service. Preferably, the method of and system for denial-of-service protection blocks the identified source mounting a denial-of-service attack or any other identified source of malware. However, other network data processing options are contemplated including redirecting the network data from a malicious source or flow controlling network data received from the network source mounting a denial-of-service attack.

In a first aspect of the present invention, a method of denial-of-service protection for a computer system is provided. The method comprises the steps of collecting network data from an interface receiving network data from one or more sources, analyzing the network data identifying the source of the system exploitation upon receiving an indication of a system exploitation, and processing subsequently received network data to prevent a denial-of-service. In one embodiment, application information, process information, or a combination thereof collected is used in the analysis identifying the malicious source. In one embodiment, the source is client computers requesting services from the computer system or server. Once an indication of system exploitation is received, the collected data which includes network data, application data, or any combination thereof is analyzed to determine the network source that caused the denial-of-service attack. In one embodiment, network data received subsequent to the exploitation indication is also used in the analysis. The analysis includes statistical techniques, heuristic techniques, or a combination thereof to determine the source of a malicious host mounting the denial-of-service attack or the source of malware.

While denial-of-service attacks are one type of system exploitation, in some embodiments the method is used to protect against other system exploitations. The indication of system exploitation includes the detection of a virus or a rogue programs externally injected into the computer system. Once the malicious source is identified, received network data is processed to prevent or limit an exploitation by means including blocking data from the malicious source, redirecting the malicious source data to another interface or computing system to study the method of exploitation, or flow controlling the malicious source to limit the effect of the exploitation.

In accordance with another embodiment of the present invention, the network data includes, times a service connection was made, connection durations, a time a packet was received, host identifiers, a number of connections from a host, number of packets from a host, protocol identifier, port number, packet payloads, assembled packet data, or any combination thereof. Further, any other data that identifies the source of the network data can be included. Network data can include reassembling packets and inspecting the packet headers and content.

In accordance with one embodiment of the present invention, the processing of the network data from the malicious source comprises one or more of blocking, redirecting, and flow controlling the network data associated with the malicious source. Each network packet is checked for its origin. If the origin of the network data does not match an identified malicious source, then the packet is passed unimpeded to the destination requesting the data. If the packet source matches an identified malicious source, as determined from the analysis of the data, then the data packet is blocked. In one embodiment, a blocked packet is dropped and not delivered to the requesting application. In an alternative embodiment, the packet redirected for later analysis the network data from the malicious source is stored or analyzed by a different system. In another embodiment, the processing of the network data flow controls the data from the malicious source. A denial-of-service attack sends an excessive number of service requests to a server. Flow control of requests originating from a network source identified as malicious reduces the frequency of these requests and thus reduce load on the computer system providing services. In a further embodiment, the collected application information, process information, or a combination thereof is used to selectively process the network data.

In another embodiment in accordance with the present invention, the method further comprises collecting application information, process information, or both. The information collected is associated with the network data and used in the identification of processing the network data. In a further embodiment, the application information, the process information, or the combination thereof is used to selectively processing the network data.

In accordance with another embodiment of the present invention, the step of processing of the network data from the malicious source is performed as part of a Transport Data Interface (TDI) filter that is added to the execution path of a TDI networking stack. The TDI networking stack receives the network data and implements the networking protocols with the computer interface. Further, in one embodiment analyzing the network data information is executed by a Transport Data Interface (TDI) filter. The analyzing utilizes one or more of the network data information, the application information, and the process information to identify the source of the malicious code or the source of the denial-of-service attack.

In accordance with a further embodiment of the present invention, the invention includes detecting a system exploitation using a predetermined address protection, which detects malicious code loaded into writable memory which accesses data structures describing an application, a library, or an operating system component or their associated data.

In a second aspect of the present invention, a denial-of-service protection system comprises a storage component containing network data, a network interface component configured to collect network data from one or more sources and store this information in the storage component, an analysis component configured to identify a malicious source from the network data upon receiving an system exploitation indication, and a processing component configured to process network data from the malicious source to prevent a denial-of-service. In one embodiment, the system identifies the malicious source processing the network data using statistical techniques, heuristic techniques, or a combination thereof.

In accordance to one embodiment of the present invention, the network data information includes connection times, host identifiers, number of connections from a host, protocol identifier, port number, packet data, assembled packet data, or any combination thereof. In response to an exploitation indication, the processing component is configured to block, redirect, flow control, or any combination thereof of the network data from the malicious source. In one embodiment, the processing component includes in a Transport Data Interface (TDI) filter added to the execution path of the TDI networking stack. In a further embodiment, the analysis component is incorporated into the Transport Data Interface (TDI) filter. The analysis component utilizes one or more of the network data information, the application information, and the process information to identify the source of the malicious code or the source of the denial-of-service attack.

In accordance with another embodiment, the processing component of the system further comprises collecting application information, processing information, or a combination thereof, wherein the application information and the process information are associated with the network data, and used by the analysis component in the identification of the malicious source. In a further embodiment of the system, the application information, the process information, or the combination thereof is used by the processing component to selectively process the network data.

In a further embodiment, the system includes a malicious detection component configured to detect malicious code executing in writable memory when the code accesses a predetermined address. The detection generates the system exploitation indication but other exploitation detection methods are contemplated.

In another aspect to of the present invention, a computer device comprising a computer readable storage medium having computer executable instructions thereon for denial-of-service protection, the steps comprising: collecting network data, analyzing network data identifying a malicious source, and processing the network data from the identified malicious source to prevent a denial-of-service to block, redirect, or flow control the network data. In one embodiment, the computer device includes collecting network data from an interface receiving network data from one or more sources and analyzing the network data to identify a malicious source from the one or more sources upon receiving a system exploitation indication. Further the steps include processing network data, origination from the malicious source. In one embodiment, the analysis of the network data utilizes statistical and heuristic techniques.

In accordance with another embodiment of the present invention, the processor readable code is configured to analyze the network data comprising one or more of a time the connection was made, a time a packet was received, a connection duration, host identifiers, a number of connections from a host, a protocol identifier, a port number, packet data, assembled packet data, or any combination thereof. Further, any other data that identifies directly or indirectly identifies the source of the network data can be use. This can include inspecting the packet headers, and reassembling packets to inspect the content.

In accordance with another embodiment of the present invention, the processor readable code includes processing the network data from the malicious source. The processing includes blocking, redirecting, or flow controlling of the network data from the malicious source. Each network packet is checked for its source. If the source of the network data does not match the an identified malicious source, including a source implementing a denial-of-service exploitation, then the packet is passed unimpeded to the computer application or component requesting the data. If the packet source matches the source identified as malicious by the analysis of the network data, then the data packet is blocked. A blocked packet is dropped and not delivered to the destination specified within the packet. Alternatively, the packet can be redirected for later analysis. The data from the malicious source can be stored or analyzed by a different machine or processor. Another approach to processing network data is to flow control data from the malicious source.

In a further embodiment, the computer device also collects application information, process information, or both. The application information and the process information are associated with the network data, and used by the computer device to selectively process network data. In a further embodiment, the computer device the application information, the process information, or both is used in selecting the network data to process.

In accordance with one embodiment of the present invention, the processor readable code, configured to process the network data from a malicious source, is part of a Transport Data Interface (TDI) filter. The processor readable code is added to the executions path of a TDI networking stack. The TDI networking stack receives the network data and implements the networking protocols associated with the computer interface. In a further embodiment, the processor readable code, includes a Transport Data Interface (TDI) filter configured to analyze one or more of the network data information, application information, and process information to identify the malicious source or the source of the denial-of-service attack.

In accordance with a further embodiment of the present invention, the processor readable code includes the detection of a system exploitation. In one embodiment, the system exploitation includes malicious code injected into writeable memory of the computer system and accesses a predetermined address.

BRIEF DESCRIPTION OF THE DRAWINGS

The invention is better understood by reading the following detailed description of exemplary embodiments in conjunction with the accompanying drawings.

DETAILED DESCRIPTION OF THE INVENTION

The following description of the invention is provided as an enabling teaching of the invention. Those skilled in the relevant art will recognize that many changes can be made to the embodiment described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances, and are a part of the present invention.

In accordance with the invention, system exploitations resulting in a denial-of-service are blocked or limited. These exploitations can include networked sources of malware or network sources directly mounting a denial-of-service attack. One form of a denial-of-service attack is for a networked host to make excessive requests for services that result in overloading a server. Alternatively, a malicious client makes service requests that injects malicious code or malware into server memory. This malware can intentionally or unintentionally interfere with the server's operation resulting in a denial-of-service. Further, prior art methods of blocking or neutralizing malicious code might leave a server unable to provide services, resulting in a denial of services.

In one embodiment, processing of the network data prevents a denial-of-service by blocking or neutralizing malware that is issuing excessive service requests that would overload the server. Blocking data from a source identified as launching a denial-of-service attack or other type of exploitation, prevents further attempts which may overload the server. Blocking a network source identified as injecting malware that interferes or disables server services also prevents denial-of-service. For denial-of-service attacks, flow controlling the network data from an identified malicious host is an effective technique for mitigating the effect of a denial-of-service attack. An additional approach to prevent a denial-of-service is to redirect to another processing system to analyze the associated network data from the source identified as overloading the server or the network source of malware. This technique is also effective in gathering information regarding the structure and from of a denial-of-service or other malware exploitation.

Figure 1:
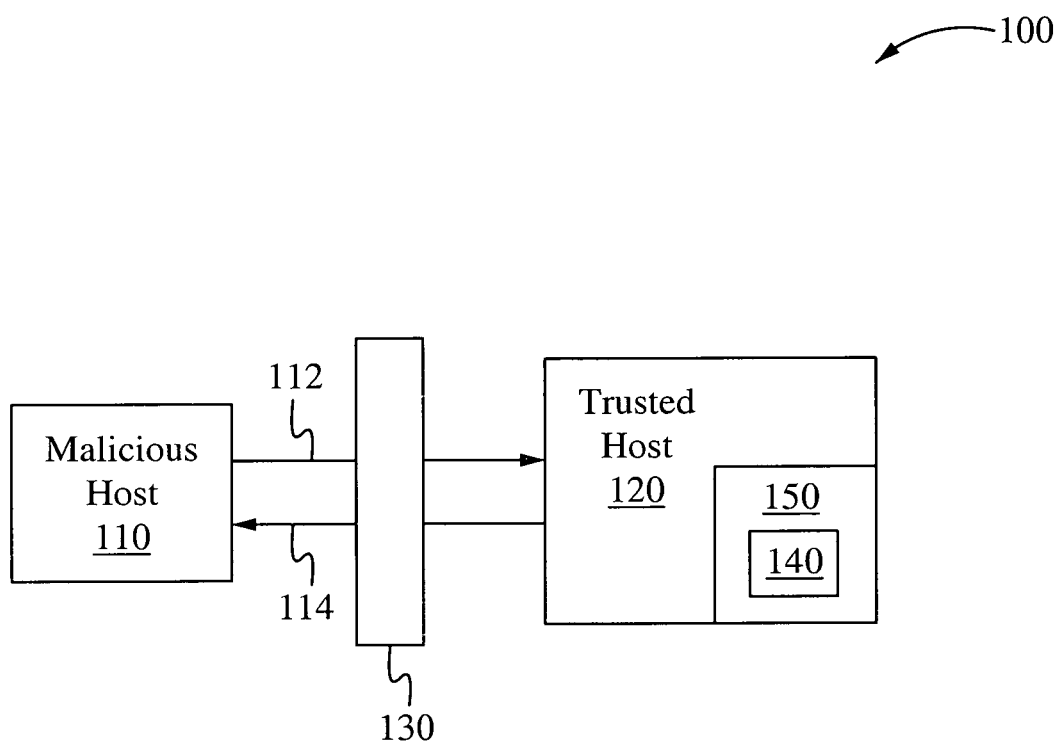
FIG. 1 illustrates a prior art configuration of a malicious host mounting a denial-of-service attack or other exploitation on a host server.
Figure 2:
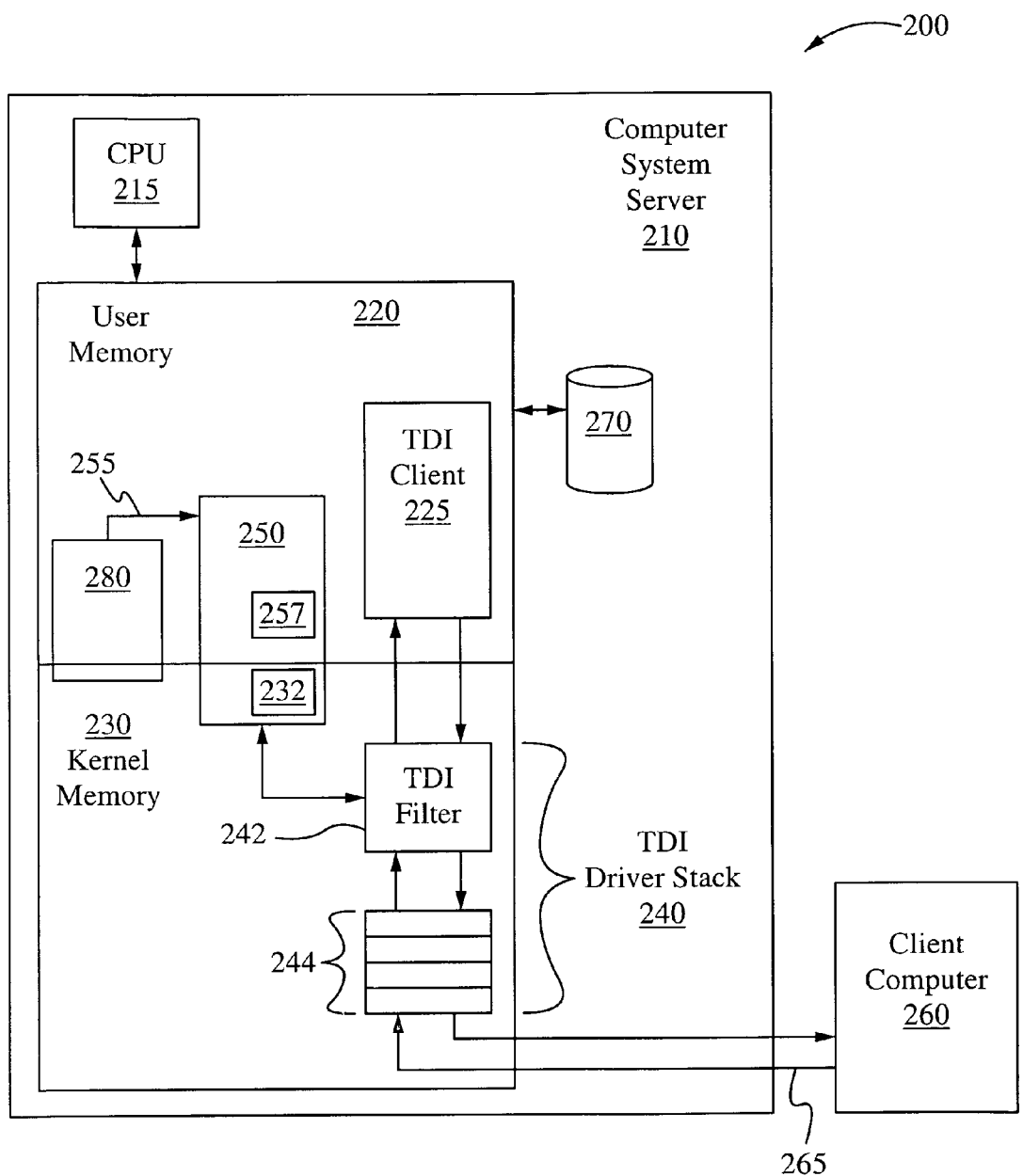
FIG. 2 illustrates a computer system configured with processing components configured to detect a denial-of-service attack or malware resulting in denial-of-service, identifying the source, and protecting against a further denial-of-services in accordance with one embodiment of the present invention.

FIG. 2 illustrates one embodiment of a computer processing system or server 200 executing the steps for determining and processing network data 265 to block or limit a denial-of-service attack or other exploitation from a malicious client 260. The computer processing system 200 can provide services over a network 265 to one or more client machines 260. The computer processing system 200 comprises a computer system 210 having user memory 220 and kernel memory 230. A TDI client (application) 225 executes from user memory 220 and connects with the driver stack 240. The application 225 typically provides network services such as email or serving web pages or can be a user connecting to the networked client computer 260. Within the kernel memory 230 a network stack 240 is shown in communication with the TDI Client 225 and the networked client computer 260. The network stack 240 implements different protocols including but not limited to TCP/IP. One example of a network stack 240 is a collection of TDI (Transport Data Interface) drivers for a Windows Serves operating system. The network driver 240 comprises the networking protocol stack 244 and a TDI filter component 242. The TDI filter component 242 is added to the network stack 240 at system boot time or later by an application. The TDI filter 242 is supplemental to the operation of the network driver stack 240. The operating system provides the capability of coupling additional processing functions into the execution path of the TDI driver stack 240 through the TDI filter 242. The TDI filter 242 provides the capability to customize the processing of network data. In one embodiment, the processing includes logging information and statistics regarding the network data transmitted between the computer server system 210 and the client computer 260.

In an exemplary embodiment, the TDI filter 242 is configured to monitor and collect the network data 265 received from network sources including a malicious client 260 launching a denial-of-service attack or being the source of other malware. The monitoring includes network level packet monitoring or monitoring at the connection level. Packet data can include time-based statistics, the number of packets or bytes received from a network address or source, or the monitoring of packet data. Host-based information can include the time a host connection is made, number of connections make within a time period, the host name, the host address, or any other parameters that identifies the TDI client 225, and the protocols being used, the client computer 260 name, or client computer 260 address.

Further, the collection of information, before or subsequent to receiving an exploitation indiction, can include information related to applications or processes related to network data being received. This data can include process identifiers, applications names, time the process or application started, CPU time used, or any combination thereof. The collection of process and application data is executed by the TDI filter 242, the analysis program 250 or another application, or process (not shown).

Additionally, in one configuration, the TDI filter 242 selectively processes network data identified as originating from a malicious source and based on an application of process identification information such as the TDI client 225 application identifier or process identifier. The processing can include blocking, redirecting, or flow controlling the network data. Each technique is useful in countering a denial-of-service attack or other malware exploitation.

A denial-of-service can be caused by a malicious host making excessive requests for services that overloads a computer system, by the infection of a computer with malicious code that either intentionally or unintentionally disables server services, or by the detection, disabling or neutralizing of the malicious code, which results in the disabling of server services an thereby results in a denial-of-services. A malicious client 260 can reinfect a server even after the infection is detected and neutralized or the server rebooted. Blocking a host identified as the source launching a denial-of-service attack has the benefit of preventing reinfection of the server and the resulting denial-of-service. Flow controlling the network data from a network source identified as overloading the system is an effective way of minimizing the effect of a denial-of-service attack. This approach is useful where a source of requests might not be mounting a denial-of-service attack or other exploitation, but the behavior of the source is suspicious. Flow controlling the requests reduces the level of service provided to the source but does not completely exclude the source from obtaining services. In accordance with another embodiment, the associated network data is from a network source originating malicious code or a denial-of-service attack is redirected to storage or to another system for analysis. This technique is used to gather data on a denial-of-service attack or information about malware or other exploitations.

Alternatively, the processing of the network data is executed outside the TDI filter 242 or TDI Driver Stack 240. In an alternative embodiment, the processing is performed by another program such as a firewall (not shown). The configuration of the firewall, to block or otherwise process the data can be by either the analysis component 250 or by the TDI filter 242 when configured to analyzed the network data information to identify the malicious source.

The collected network data is stored in either kernel memory 232, user memory 257, on a non-volatile storage device 270, or any combination thereof. The kernel memory 232 and user memory 257 are part of an analysis program 250 for identifying malicious sources. The collected network data is processed by the analysis component 250 when an indication of a system exploitation 255 is received. The analysis component can execute out of user memory 220, kernel memory 230, or a combination of both. The denial-of-service or system exploitation can include all forms of malicious code, often referred to as malware including computer viruses, worms, trojan horses, rootkits, spyware, dishonest adware, criminalware, or a host overloading a server with a flood of services requests. The analysis component 250 processes the network data using statistical and heuristic algorithms. Further, the analysis component can use the collected application information, process information, or both in the determination of the malicious source.

Alternatively, the analysis of one or more of the collected network data information, the application information, and the process information is executed by the TDI filter 242 to determined the malicious source or the source of a denial-of-service attack. The detected malicious source can be used to configure the TDI filter 242 in the processing of data from the malicious source or the source of a denial-of-service attack.

In the shown embodiment, the system includes a detection component 280 that reports or indicates a system exploitation. The detected component 280 provides a system exploitation indication 255 to the analysis component 250, which will subsequently determine the malicious source. Further, the detection component 280 can include the detection of malicious code executing out of writable memory using predetermined address protection as described in the copending and co-owned U.S. patent application Ser. No. 12/322,220, filed Jan. 29, 2009, entitled "METHOD OF AND SYSTEM FOR MALICIOUS SOFTWARE DETECTION USING CRITICAL ADDRESS SPACE PROTECTION," which is herein incorporated by reference in its entirety. Other applications describing malware protection and identification techniques include co-owned and copending U.S. patent application Ser. No. 10/651,588, filed Aug. 29, 2003 and entitled "DAMAGE CONTAINMENT BY TRANSLATION," which is herein incorporated by reference in its entirety; and U.S. patent application Ser. No. 11/122,872, filed May 4, 2005 and entitled "PIRACY PREVENTION USING UNIQUE MODULE TRANSLATION," which is herein incorporated by reference in its entirety. The system detection component 280 can execute out of user memory 220, kernel memory 230, or a combination of both.

Figure 3:
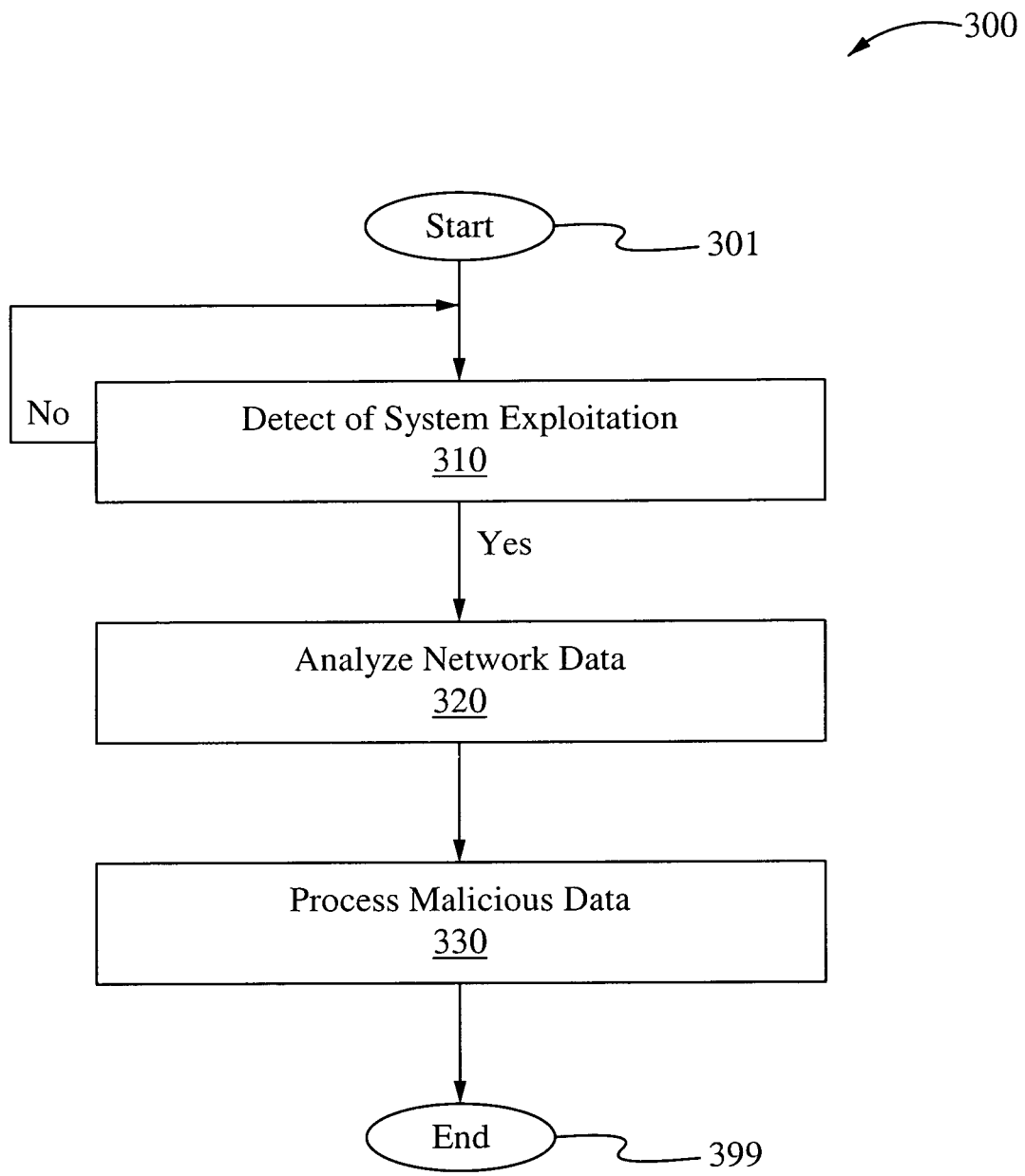
FIG. 3 illustrates the processing steps for the denial-of-service protection in accordance with one embodiment of the present invention.

FIG. 3 illustrates one embodiment of the present invention for method of preventing denial-of-service protection in accordance with one embodiment of the present invention. The method begins at a step start 301. The step 301 can include initialization of variables, software states, and hardware. Further, the step 301 can include operating system configuration including adding driver components to a networking stack. Adding a TDI filter to a TDI driver stack is one example of such configuration.

In an optional step 310, an exploitation of the system is detected. In one embodiment, the step 310 includes the detection of excessive service requests over the network from a malicious client implementing a denial-of-service attack or other malware exploitation. The detection includes a virus loaded into the computer system, or malicious code injected into and executed out of writable memory and accessing a predetermined address. Details of the detection of code executing out of writable memory can be found in the U.S.

patent application Ser. No. 12/322/220, filed Jan. 29, 2009, entitled "METHOD OF AND SYSTEM FOR MALICIOUS SOFTWARE DETECTION USING CRITICAL ADDRESS SPACE PROTECTION," which is incorporated by reference in its entirety. Other applications describing malware protection and identification techniques include the above mentioned co-owned and copending U.S. patent application Ser. No. 10/651,588, filed Aug. 29, 2003 and U.S. patent application Ser. No. 11/122,872, filed May 4, 2005. Upon detecting a system exploitation, a system exploitation indication is generated. The system exploitation indication invokes the step 320 of analyzing the network data, application data, and process data to identify a malicious source.

In the step 320 the data is analyzed to identify a malicious source. In one embodiment, the identification of the malicious source utilizes network data that includes a time the connection was made, a connection duration, a time that a packet was received, a host identifiers, a number of connections from a host, a number of packets from a host, a protocol identifier, port number, packet data, and assembled packet data. In a further embodiment, the analysis utilizes application data, process data, or a combination thereof. Further, in another embodiment the analysis uses statistical techniques, heuristics techniques, or a combination thereof in the identification of the malicious source. Once the malicious source is identified, the process continues to the step 330 in which malicious source information is received an processed.

Exemplary heuristics and statistical techniques used to identify a malicious host include but are not limited to, choosing all connected hosts, the last host to connect, the last host to send data, the last host to receive data, the last host to send and receive data within a time window, the last connected host to send data, the last connected host to receive data, the connected host that has sent the most data, the connected host that has received the most data, and the connected host that has received and sent the most data. The above mentioned techniques can incorporate additional parameters such as all hosts connected to a specific port.

Further, the techniques can include using collected information about the applications, processes, or combination thereof as part of the input to the heuristic and statistical techniques for identifying the malicious host. For example, the collected network data could include choosing all connected hosts to a specific application or process, the last host to connect to a specific application or process, the last host to send data to a specific application or process, the last host to receive data from a specific application or process, the last host to send and receive data within a time window to a specific application or process, the last connected host to send data to a specific application or process, the last connected host to receive data to a specific application or process, the connected host that has sent the most data to a specific application or process, the connected host that has received the most data from a specific application or process, and the connected host that has received and sent the most data to a specific application or process.

Statistical techniques for identifying a malicious host include but are not limited to statistical deviation of the number of connections or packets from a host that exceeds a threshold, an amount of data sent by a host within a time interval, or an amount of data received by a host within a time interval. In one embodiment, the statistics are calculated over a time period that includes multiple system re-boots or system exploitations. Further, in another embodiment a running average of the above statistics can be used to adapt to time varying statistical variations.

In the step 330, received network data identify as originating from the malicious source is further processed. If a originating source is not identified as malicious, then network data is passed to the destination unimpeded. The data identified as originating from a malicious source is processed to prevent or diminish a denial-of-service attack or other malware exploitation that can result in a denial of service. In one embodiment, the processing includes blocking the network data and/or connection from the identified malicious source. In another embodiment, the processing includes modifying packets or data streams from the malicious source. Another method of processing data includes redirecting data to another processing system or storage device for later analysis. In a further embodiment, the processing of network data includes flow controlling the data by means including delaying the delivery of the data. The process can further be limited to data packets or streams associated with an application or process or using attributes associated with an application or attribute. The processing ends in the step 399.

Network data is processed by a software component hooked or linked into a network stack. In an embodiment that uses Windows Server®, the network stack is called a Transport Data Interface (TDI) driver stack 240. A TDI filter 242 is coupled into the execution path for the TDI driver 240. The TDI filter 242 collects network data, network information, and statistics on received network data. Additionally, the TDI filter 242 processes the network data packets and data streams received from the network interface for blocking, redirecting, or flow controlling the identified malicious network data. Further, some embodiments, the TDI filter 242 is configured to analyze the collected network data, network information and statistics to determine the source of the malicious host or the source of the denial-of-service attack. The identified malicious source is used to configure the blocking, or flow controlling the network data. In other embodiments, the TDI filter configures an external component, such as a firewall, to block the detected malicious source or source of the denial-of-service attack.

Figure 4:
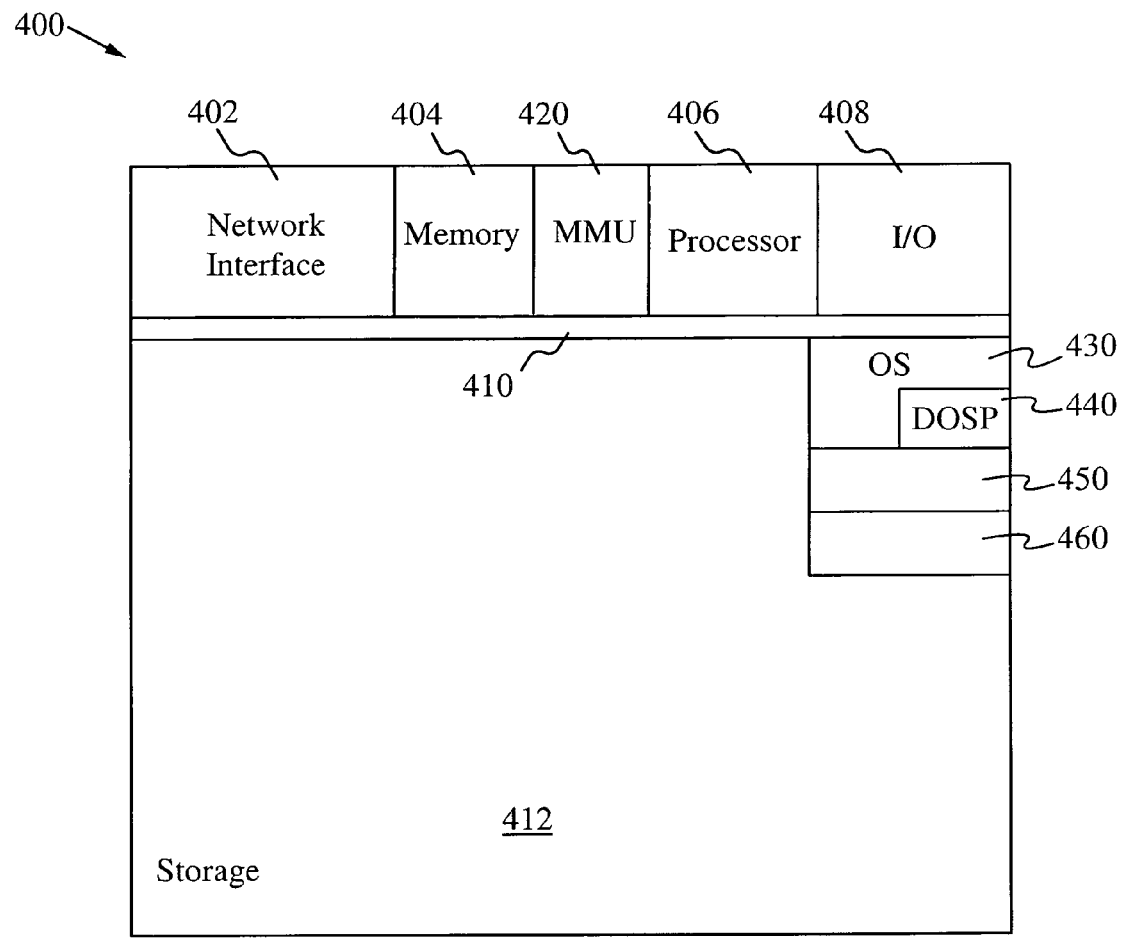
FIG. 4 illustrates a block diagram of an exemplary computing device configured to protect a computer system against a denial-of-service attack or malware in accordance with one embodiment of the present invention.

FIG. 4 illustrates a block diagram of a computing device 400 configured to implement a computer automated method of providing denial-of-service protections in accordance with one embodiment of the present invention. The computing device 400 is a server providing network services to a client or host computer that mounts denial-of-service attacks or is the source of other malware. Alternatively, the computing device 400 is another type of system with different capabilities. In one embodiment, the computing device 400 receives service requests that include file sharing services, web server services, and e-mail services. The computing device 400 includes a storage system 412 for program and data storage. The data storage can include web pages, files, and e-mails. The storage of the denial-of-service protection code can be stored on separate devices or on the same device as the computing device 400. For example, the code for the denial-of-service or other exploitation protection can be stored on a tape, a local hard drive, CD-ROM, a DVD, or solid state memory. Further, in one embodiment the computing device 400 communicates with other computational systems including a human interface such as a graphical user interface. The communication is through a network, a direct communication link, or through an operating system communication channel such as a socket. In general, a hardware structure suitable for implementing the computing device 400 can include a network interface 402, a memory 404, a memory management unit (MMU) 420, a processor 406, I/O device(s) 408, a bus 410 and the storage device 412. The processor 406 can be almost any type, so long as it has sufficient speed. The memory 404 can be any conventional computer memory known in the art.

The storage device 412 can include a hard drive, tape, CDROM, CDRW, DVD, DVDRW, flash memory card or any other storage device. An example of the network interface 402 includes a network card coupled to an Ethernet or other type of LAN. The I/O device(s) 408 can include one or more of the following: keyboard, mouse, monitor, display, printer, modem, touchscreen, button interface and other devices including remote systems. The code for the denial-of-service protection (DOSP) 440 can be configured into the OS (operating system) 430 and is part of the OS 430 initialization. The analysis code 450 for the analyzing the network data and identifying the malicious host or client are a component separate from the OS 430. Additionally, in one embodiment code 460 for the detection of a system exploitation is found on the storage. More or fewer components shown in FIG. 4 can be included in the computing device 400. Additional processors, either distributed or not distributed, and additional storage can be incorporated.

Reference has been made in detail to the preferred and alternative embodiments of the invention, examples of which are illustrated in the accompanying drawings. It will be readily apparent to one skilled in the art that other modifications may be made to the embodiment without departing from the spirit and scope of the invention as defined by the appended claims. On the contrary, the invention is intended to cover alternatives, modifications and equivalents, which can be included within the spirit and scope of the invention. Furthermore, in the detailed description of the present invention, numerous specific details have been set forth in order to provide a thorough understanding of the present invention. However, it should be noted that the present invention can be practiced without these specific details. In other instances, well known methods, procedures and components have not been described in detail so as not to unnecessarily obscure aspects of the present invention.

What is claimed is:

1. A method of denial-of-service protection for a computer system comprises:
   collecting network data information from an interface receiving network data from one or more sources;
   collecting application data describing attributes of one or more software applications utilized by the computer system;
   identifying a subset of the network data as associated with the application data, the subset of network data including less than all of the collected network data;
   receiving a system exploitation indication identifying detection of an attempt by malicious code to access a predetermined memory address;
   analyzing the subset of the network data information to identify a malicious source corresponding to the malicious code, from the one or more sources; and
   processing network data originating from the malicious source to prevent denial-of-service, wherein processing the network data includes redirecting network traffic associated with the malicious source to another system, wherein at least a portion of the redirected traffic is analysed at the other system.

2. The method of claim 1, wherein the analysis the subset of the network data comprises statistical techniques, heuristic techniques, or a combination thereof.

3. The method of claim 2, wherein the network data comprises one or more of, a time the connection was made, a connection duration, a time that a packet was received, a host identifiers, a number of connections from a host, a number of packets from a host, a protocol identifier, port number, packet data, and assembled packet data.

4. The method of claim 2, wherein the processing the network data from the malicious source comprises one or more of blocking, redirecting, and flow controlling of the malicious data.

5. The method of claim 4, further comprising collecting process information, wherein the process information is associated with the network data, and used in the identification of the subset of the network data.

6. The method of claim 1, wherein the network data originating from the malicious source is processed using a Transport Data Interface (TDI) filter added to the executions path of a TDI networking stack coupled to the computer interface.

7. The method of claim 1, wherein the subset of the network data information is analyzed using a Transport Data Interface (TDI) filter.

8. The method of claim 1, further comprising generating a system exploitation indication in response to the detection of code executing out of writable memory space on the computer system.

9. A system for denial-of-service protection comprising:
   a storage component containing network data information;
   a network interface component configured to collect network data information from one or more sources;
   an analysis component configured to collect application data describing attributes of one or more software applications utilized by the system, identify a subset of the network data information associated with the application data, the subset of network data information including less than all of the collected network data information, receive a system exploitation indication identifying detection of an attempt by malicious code to access a predetermined memory address, and analyze the subset of the network data to identify a malicious source corresponding to the malicious code; and
   a processing component configured to process network data from the malicious source, wherein processing the network data includes redirecting network traffic associated with the malicious source to another system, wherein at least a portion of the redirected traffic is analysed at the other system.

10. The system of claim 9, wherein the analysis component is configured to identify the malicious source using statistical techniques, heuristic techniques, or a combination thereof.

11. The system of claim 10, wherein the network data information comprises one or more of, connection times, packet receipt times, host identifiers, a number of connections from a host, number of packets from a host, protocol identifiers, port numbers, packet data, and assembled packet data.

12. The system of claim 10, wherein the processing component is configured to block, redirect, flow control the network data from the malicious source, or any combination thereof.

13. The system of claim 12, wherein the processing component further comprises collecting is further configured to collect at least one of the application information, process information, or a combination thereof, wherein the application information and the process information are associated with the network data, and used by the analysis component in the identification of the malicious source.

14. The system of claim 13, wherein the application information, the process information, or the combination thereof is used by the processing component to selectively process the network data.

15. The system of claim 11, wherein the processing component is included in a Transport Data Interface (TDI) filter added to the execution path of a TDI networking stack.

16. The system of claim 11, wherein the analysis of the network data information is executed by a Transport Data Interface (TDI) filter.

17. The system of claim 10, further comprising a malicious code detection component configured to detect malicious code using a predetermined address protection.

18. A computer device comprising a non-transitory, computer-readable storage medium having computer executable instruction thereon for denial-of-service protection by performing the steps:
 collecting network data information from an interface receiving network data from one or more sources;
 collecting application data describing attributes of one or more software applications utilized by the system;
 identifying a subset of the network data as associated with the application data, the subset of network data including less than all of the collected network data;
 receiving a system exploitation indication identifying detection of an attempt by malicious code to access a predetermined memory address;
 analyzing the subset of the network data information to identify a malicious source corresponding to the malicious code, from the one or more sources; and
 processing the network data originating from the malicious source, wherein processing the network data includes redirecting network traffic associated with the malicious source to another system, wherein at least a portion of the redirected traffic is analysed at the other system.

19. The computer device of claim 18, wherein the processor readable code for processing network data information comprises statistical techniques, heuristic techniques, or a combination thereof.

20. The computer device of claim 19, wherein the network data information comprises times a connection was made, connections duration, a time that a packet was received, host identifiers, a number of connections from a host, a number of packets from a host, protocol identifiers, port numbers, packet data, assembled packet data, or any combination thereof.

21. The computer device of claim 19, wherein the processing the network data comprises one or more of blocking, redirecting, or flow control of the network data from the malicious source.

22. The computer device of claim 21, further comprising collecting process information, wherein the process information is associated with the network data, and used in the identification of the subset of the network data.

23. The computer device of claim 22, wherein the application information, the process information, or the combination thereof is used to selectively processing the network data.

24. The computer device of claim 20, wherein the processing the network data from the malicious source is performed by a Transport Data Interface (TDI) filter.

25. The computer device of claim 20, wherein the analysis of the subset of the network data information is executed by a Transport Data Interface (TDI) filter.

26. The computer device of claim 19, further comprising the step of detecting malicious code using a predetermined address protection, wherein the detection of code executing out of writable memory space generates the system exploitation indication.

* * * * *